(12) United States Patent
Austin et al.

(10) Patent No.: US 8,403,218 B1
(45) Date of Patent: Mar. 26, 2013

(54) METHOD AND APPARATUS FOR ULTRASONIC DATA TRANSMISSION AND LOCATIONING

(75) Inventors: Timothy B. Austin, Stony Brook, NY (US); Mark W. Duron, East Patchogue, NY (US); Daniella N. Strat, Sound Beach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/370,748

(22) Filed: Feb. 10, 2012

(51) Int. Cl.
*G06K 7/00* (2006.01)
(52) U.S. Cl. ......................... 235/439; 235/435
(58) Field of Classification Search .................. 235/375, 235/379, 380, 435, 439, 451, 454, 487, 492
See application file for complete search history.

(56) References Cited

U.S. PATENT DOCUMENTS

| | | | |
|---|---|---|---|
| 2007/0037522 A1 | 2/2007 | Liu et al. | |
| 2007/0076645 A1* | 4/2007 | VanDrunen | 370/315 |
| 2009/0032592 A1* | 2/2009 | Christensen | 235/439 |

* cited by examiner

*Primary Examiner* — Michael G Lee
*Assistant Examiner* — Matthew Mikels

(57) ABSTRACT

A method and apparatus for transmitting data from an ultrasonic tag to an ultrasonic reader. The method comprises generating and transmitting an ultrasonic sound pressure wave, receiving the ultrasonic sound pressure wave at a first ultrasonic repeater, determining that the received ultrasonic sound pressure wave was not processed at the ultrasonic reader, retransmitting the ultrasonic sound pressure wave from the first ultrasonic repeater, and processing the retransmitted ultrasonic sound pressure wave at the ultrasonic reader.

16 Claims, 7 Drawing Sheets

METHOD AND APPARATUS FOR ULTRASONIC DATA TRANSMISSION AND LOCATIONING

FIELD OF THE DISCLOSURE

The present disclosure relates generally to ultrasonic data tags, and more particularly to transmitting data from an ultrasonic tag to an ultrasonic reader.

BACKGROUND

Ultrasonic identification tags are used to mark, inventory and track various items. Ultrasonic identification tags generally modulate and transmit data ultrasonically, and the data may include, for example, a serial number or product information. An ultrasonic reader may then receive and demodulate the data, determining a presence of the items.

Ultrasonic signals are generally poor at permeating sound absorbing or reflecting barriers such as walls. Therefore, the signal to noise ratio of data transmitted from a tag may be reduced by the environment between the tag and a reader. For example, layers of sound absorbent and/or reflective material, such as soft fabrics or thermal insulation, may attenuate the sound pressure level or loudness of the ultrasonic sound wave. As the signal to noise ratio increases, the likelihood of mishearing or not hearing a tag increases.

Additionally, as ultrasonic signals are generally poor at permeating sound absorbing or reflecting barriers, such as walls, a large number of sensors are often required for accurate locationing of tags.

Accordingly, there is a need for an improved method and apparatus for ultrasonic data transmission and/or locationing.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
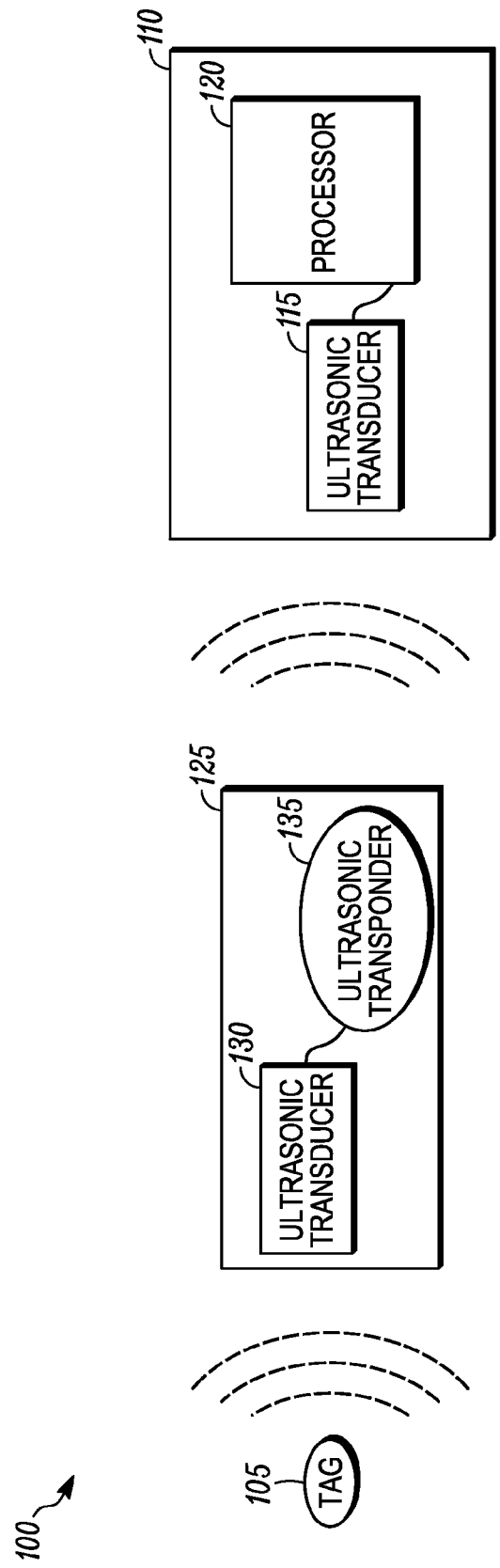
FIG. 1 is a block diagram of a system for transmitting data from an ultrasonic tag to an ultrasonic reader, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present disclosure, a method is provided for transmitting data from an ultrasonic tag to an ultrasonic reader. The method comprises generating and transmitting an ultrasonic sound pressure wave; receiving the ultrasonic sound pressure wave at a first ultrasonic repeater; determining that the received ultrasonic sound pressure wave was not processed at the ultrasonic reader; retransmitting a copy of the ultrasonic sound pressure wave from the first ultrasonic repeater; and processing the retransmitted ultrasonic sound pressure wave at the ultrasonic reader.

FIG. 1 is a block diagram of a system 100 for transmitting data from an ultrasonic tag 105 to an ultrasonic reader 110, according to one embodiment.

The ultrasonic tag 105 generates and transmits an ultrasonic sound pressure wave. The ultrasonic tag 105 includes a transponder such as a speaker (not shown) that transmits data relating to the ultrasonic tag 105. The data can include, for example, a serial number, product information, or any other suitable data. The data can be modulated according to any known modulation scheme, such as a frequency or time based modulation schemes.

The ultrasonic reader 110 includes an ultrasonic transducer 115 and a processor 120 coupled to the ultrasonic transducer 115. The ultrasonic reader 110 can include further components not shown in FIG. 1, such as, for example, a network interface, a memory and/or a visual display.

The system 100 further includes an ultrasonic repeater 125. The ultrasonic repeater 125 includes an ultrasonic transducer 130 and an ultrasonic transponder 135 operatively coupled to the ultrasonic transducer 130. The ultrasonic repeater 125 receives the ultrasonic sound pressure wave from the ultrasonic tag 105. The ultrasonic repeater 125 can then simply retransmit a signal received by the ultrasonic transducer 130, or process the signal prior to retransmission. The signal can be re-modulated using another modulation scheme or parameter, and/or the data of the signal can be modified. For example, the data can be modified to indicate that the signal has been transmitted through the ultrasonic repeater 125.

According to certain embodiments, the ultrasonic repeater 125 outputs a signal at a stronger power than output by the ultrasonic tag 105. This enables the placement of ultrasonic repeaters 125 near a plurality of ultrasonic tags 105, while having a single or smaller number of ultrasonic readers 110 located further away from the ultrasonic tags 105.

According to certain embodiments, the ultrasonic repeater 125 determines whether the received ultrasonic sound pressure wave or signal was received and/or processed by the ultrasonic reader 110 or not. The ultrasonic repeater 125 then selectively repeats only the signals that are determined not to have been received and/or processed by the ultrasonic reader 110. The ultrasonic repeater 125 can determine that the received ultrasonic sound pressure wave was not received and/or processed by the ultrasonic reader 110 by determining, for example, that a sound pressure level of the received ultrasonic sound pressure wave is below a predetermined threshold, or based upon the distance to the ultrasonic reader 110.

Figure 2:
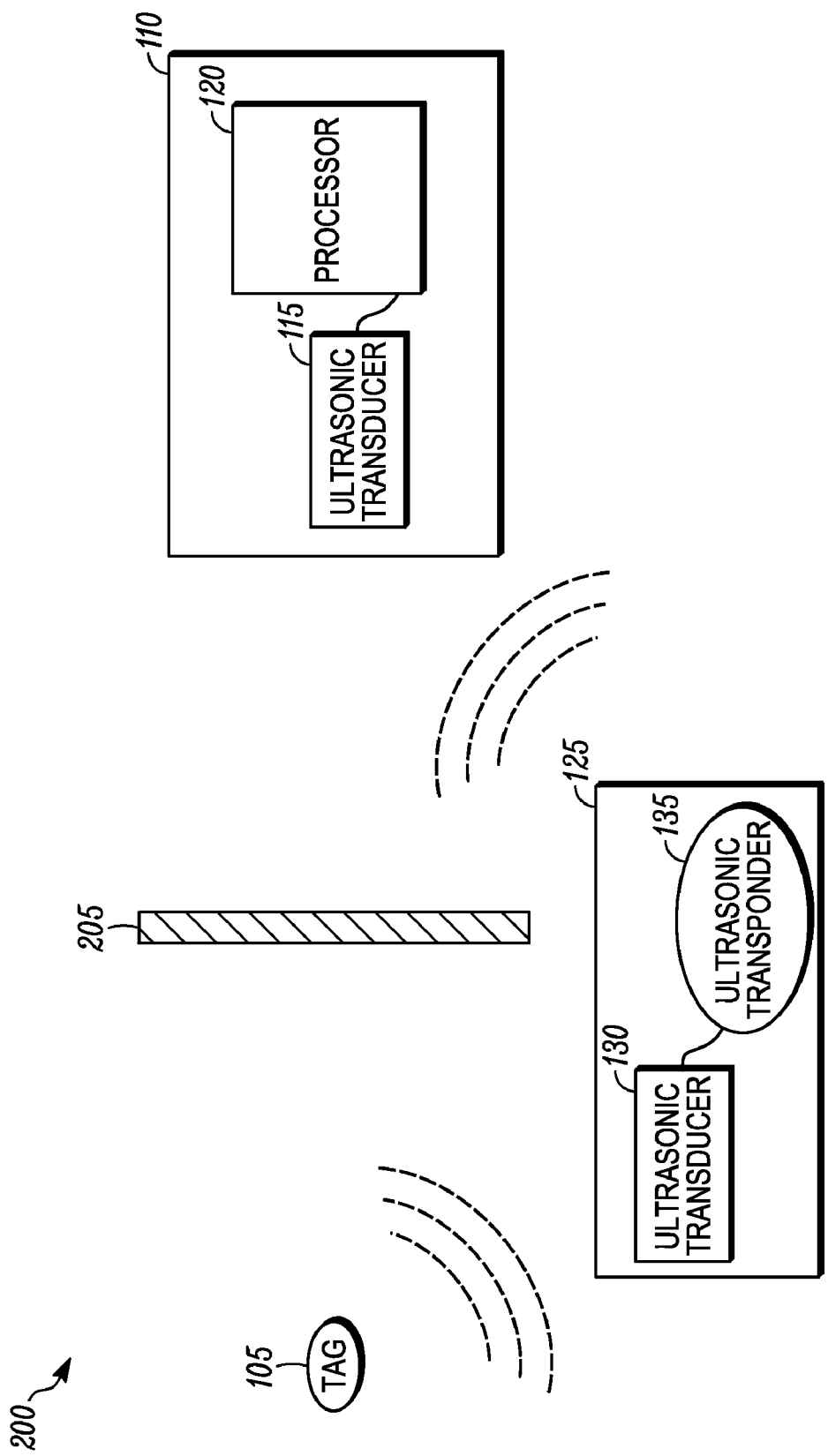
FIG. 2 is a further block diagram of a system for transmitting data from an ultrasonic tag to an ultrasonic reader, in accordance with some embodiments.

FIG. 2 is a further block diagram of a system 200 for transmitting data from an ultrasonic tag 105 to an ultrasonic reader 110, according to one embodiment. The system 200 is similar to the system 100, but with the addition of a sound absorbent and/or reflective object 205 present between the tag ultrasonic 105 and the ultrasonic reader 110.

The ultrasonic tag 105 transmits data that cannot pass through the sound absorbent and/or reflective object 205 to the ultrasonic reader 110. The ultrasonic repeater 125 is, however, placed such that it has a clear path to the ultrasonic reader 110 and a clear path to the ultrasonic tag 105. Thus the signal data can pass from the ultrasonic tag 105 to the ultrasonic repeater 125, and then from the ultrasonic repeater 125 to the ultrasonic reader 110.

According to certain embodiments, the ultrasonic repeater 125 is aware of the position of the sound absorbent and/or reflective object 205. Based upon an estimation of the location of the ultrasonic tag 105, the ultrasonic repeater 125 then determines that the signal from the ultrasonic tag 105 was not received and/or processed by the ultrasonic reader 110.

Figure 3:
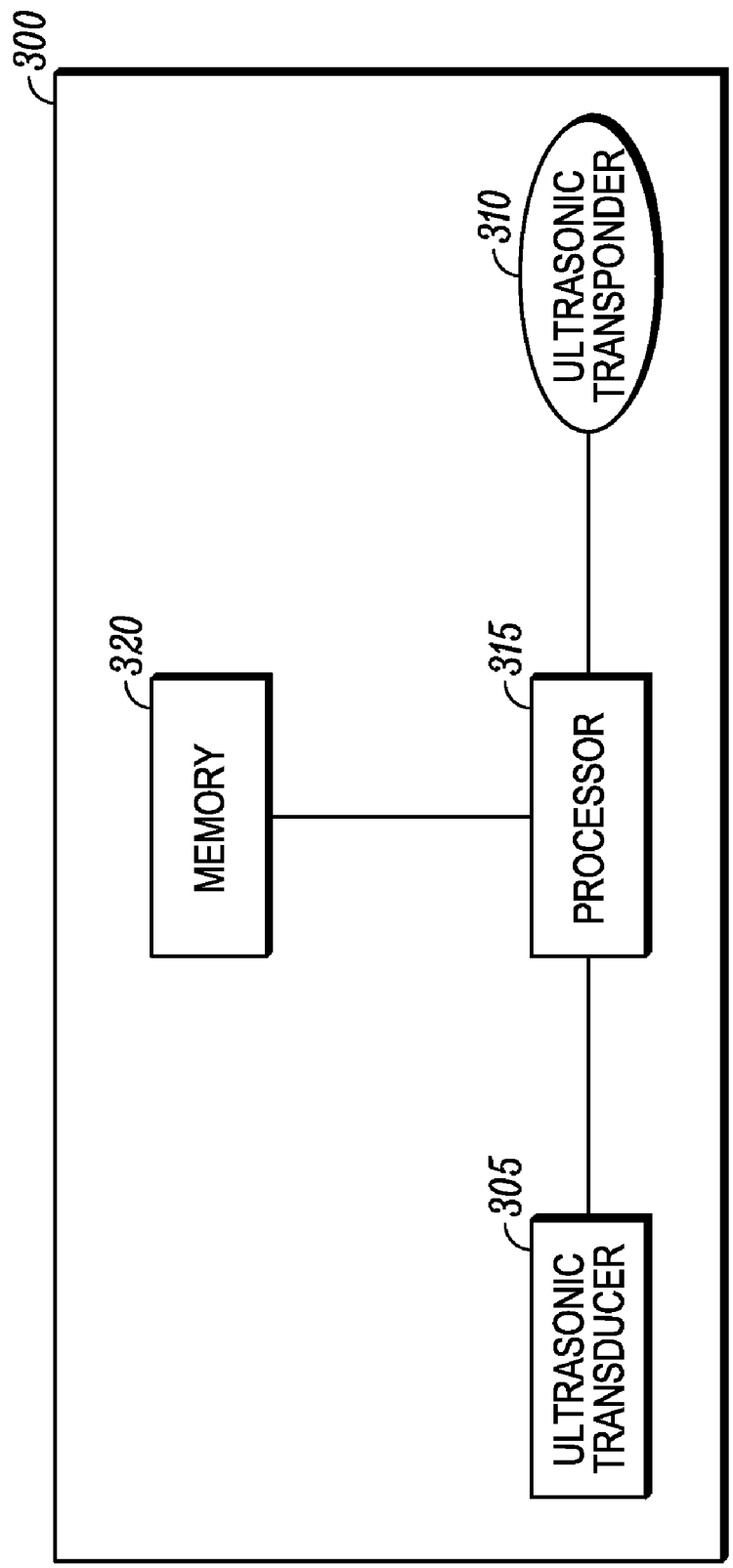
FIG. 3 is a block diagram of an ultrasonic repeater, in accordance with some embodiments.

FIG. 3 is a block diagram of an ultrasonic repeater 300, according to one embodiment. The ultrasonic repeater 300, which can be identical or similar to the ultrasonic repeater 125, includes an ultrasonic transducer 305, an ultrasonic transponder 310 operatively connected to the ultrasonic transducer 305 via a processor 315, and a memory 310 operatively connected to the memory 320.

The ultrasonic transducer 305 receives an ultrasonic signal. The ultrasonic signal is then decoded and/or demodulated using computer instruction code stored on the memory 320 and executed by the processor 315. The memory 320 can include further instructions for processing of the signal and/or demodulated data. The demodulated data is then encoded and/or modulated using computer instruction code stored on the memory 320 and executed by the processor 315, and subsequently transmitted by the ultrasonic transponder 310.

Figure 4:
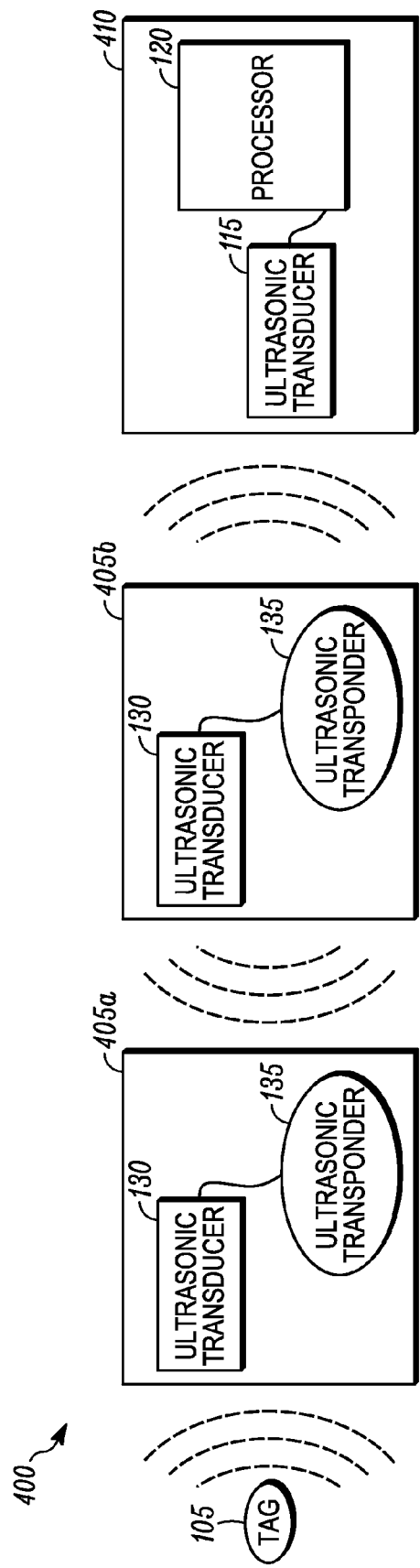
FIG. 4 is a block diagram of another system for transmitting data from an ultrasonic tag to an ultrasonic reader, in accordance with some embodiments.

FIG. 4 is a block diagram of another system 400 for transmitting data from an ultrasonic tag 105 to an ultrasonic reader 410, according to one embodiment. The system 400 includes a plurality of ultrasonic repeaters 405a and 405b.

The ultrasonic tag 105 transmits ultrasonic data as described above. The ultrasonic repeaters 405a and 405b listen for data from the ultrasonic tag 105. Upon reception of data from the ultrasonic tag 105, the ultrasonic repeaters 405a and 405b broadcast details of the data that they have received. The details can include a data identifier, or other data identification means. By broadcasting details of the data that has been received, the plurality of repeaters 405a and 405b are aware of at least some of the data that other repeaters have received, and accordingly each repeater of the plurality of repeater 405a and 405b need not retransmit the data.

According to one embodiment, the ultrasonic repeaters 405a and 405b broadcast a time at which each ultrasonic sound pressure wave is received. The ultrasonic repeater 405a can then determine that the ultrasonic repeater 405b did not receive the ultrasonic sound pressure wave by determining that a broadcast from the second ultrasonic repeater 405b was not received by the ultrasonic repeater 405a within a predetermined time limit. The ultrasonic repeater 405a can then retransmit the signal.

In the block diagram of FIG. 4, both ultrasonic repeaters 405a and 405b receive the ultrasonic data from the ultrasonic tag 105. Each ultrasonic repeater 405a and 405b then determines if the received ultrasonic sound pressure wave was not received and/or processed by the ultrasonic reader 410, e.g. if a later ultrasonic repeater has not heard the ultrasonic data. This is performed by listening for a broadcast of details of the data from the later ultrasonic repeater 405b or the ultrasonic reader 410.

In this case, the repeater 405a determines that the data it has received has also been received by repeater 405b, based upon the broadcast of data from the repeater 405b. Repeater 405b determines that the ultrasonic data has not been received by ultrasonic reader 410, as it does not receive broadcast data from the ultrasonic reader 410. The repeater 405a will therefore not perform any further actions, wherein the repeater 405b will retransmit the data. The ultrasonic receiver 410 then receives the ultrasonic data from the repeater 405b, and broadcasts details of the received data.

As will be understood by a person skilled in the art, the repeaters 405a, 405b need not determine that the ultrasonic data has not been received by a later entity. The repeaters 405a, 405b can retransmit all data to which details have not been received from the later repeater 405b or ultrasonic receiver 410.

The broadcast need not be ultrasonic, but can instead be one of sonic, wired electrical, optical, RF, or RF backscatter signaling.

Figure 5:
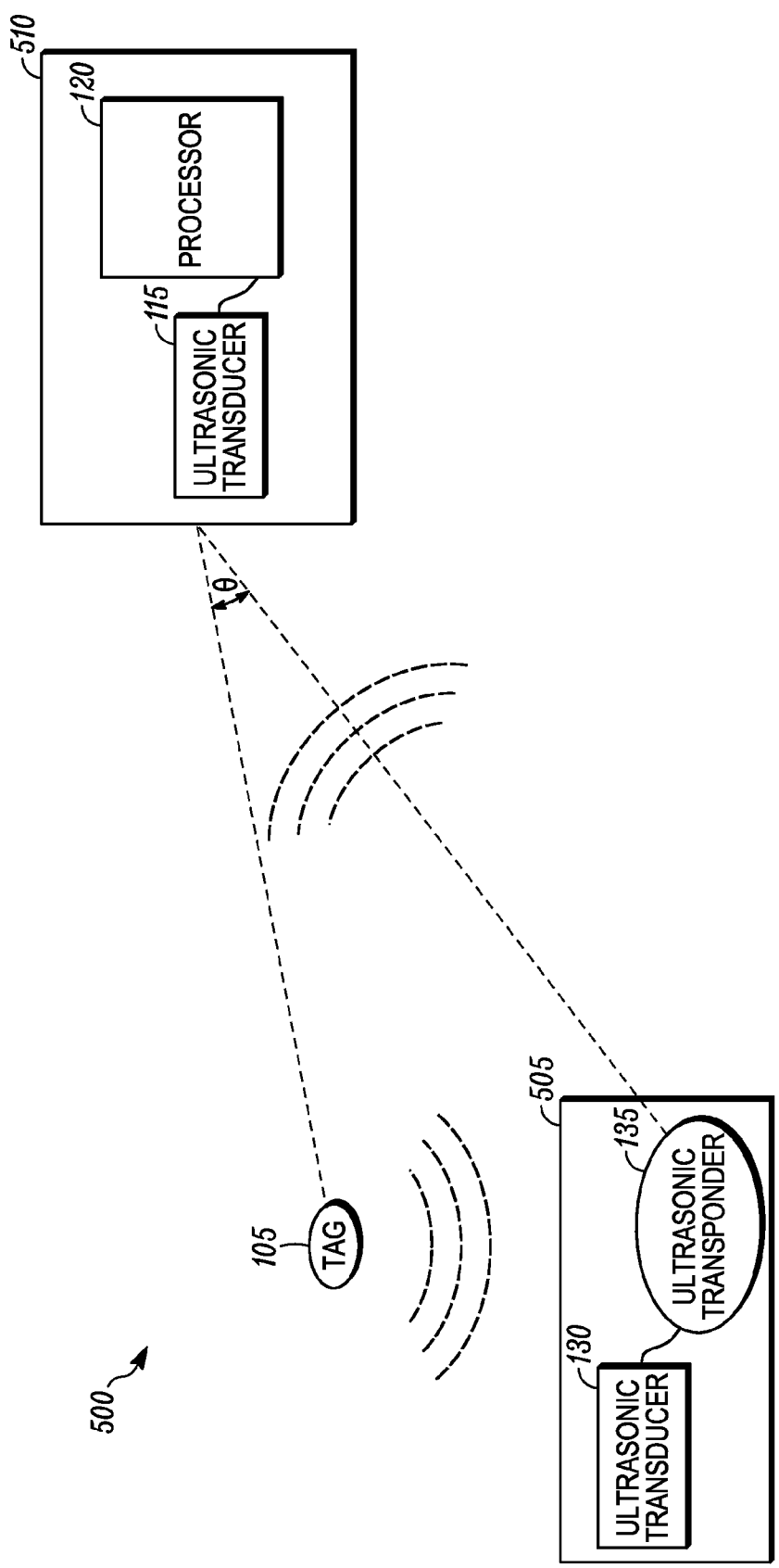
FIG. 5 is a block diagram of a system for estimating a location of an ultrasonic tag, in accordance with some embodiments.

FIG. 5 is a block diagram of a system 500 for estimating a location of an ultrasonic tag 105, according to one embodiment.

The system 500 includes an ultrasonic repeater 505 and an ultrasonic reader 510. The ultrasonic repeater 505 can be similar to the ultrasonic repeater 125, 405a or 405b.

The transmission strength of the ultrasonic tag 105 is lower than the transmission strength of the ultrasonic repeater 505. The distance that can be covered by the signal of the ultrasonic tag 105 is therefore shorter than that of a signal from the ultrasonic repeater 505. According to one embodiment, the distance that can be covered by the signal from the ultrasonic repeater is more than 10 times greater than the signal from the ultrasonic tag 105.

As the ultrasonic tag 105 is close to the ultrasonic repeater 505, the repeated ultrasonic signal can be used to gain an approximate location of the ultrasonic tag 105, even when that source is not heard directly by the reader 510.

According to one embodiment, the ultrasonic reader 510 either knows the location of the ultrasonic repeater 505 or can determine the location of the ultrasonic repeater 505. The ultrasonic reader 510 can then determine, based upon the location of the ultrasonic repeater 505, a maximum angle θ between the known location of the ultrasonic repeater and the ultrasonic tag. The system 500 can consider the angle θ sufficiently small, e.g. below a predetermined threshold, that the location of the ultrasonic repeater 505 is an accurate estimation of the location of the ultrasonic tag 105. The location of the ultrasonic repeater 505 is then determined and used as an estimate for the location of the ultrasonic tag 105.

Figure 6:
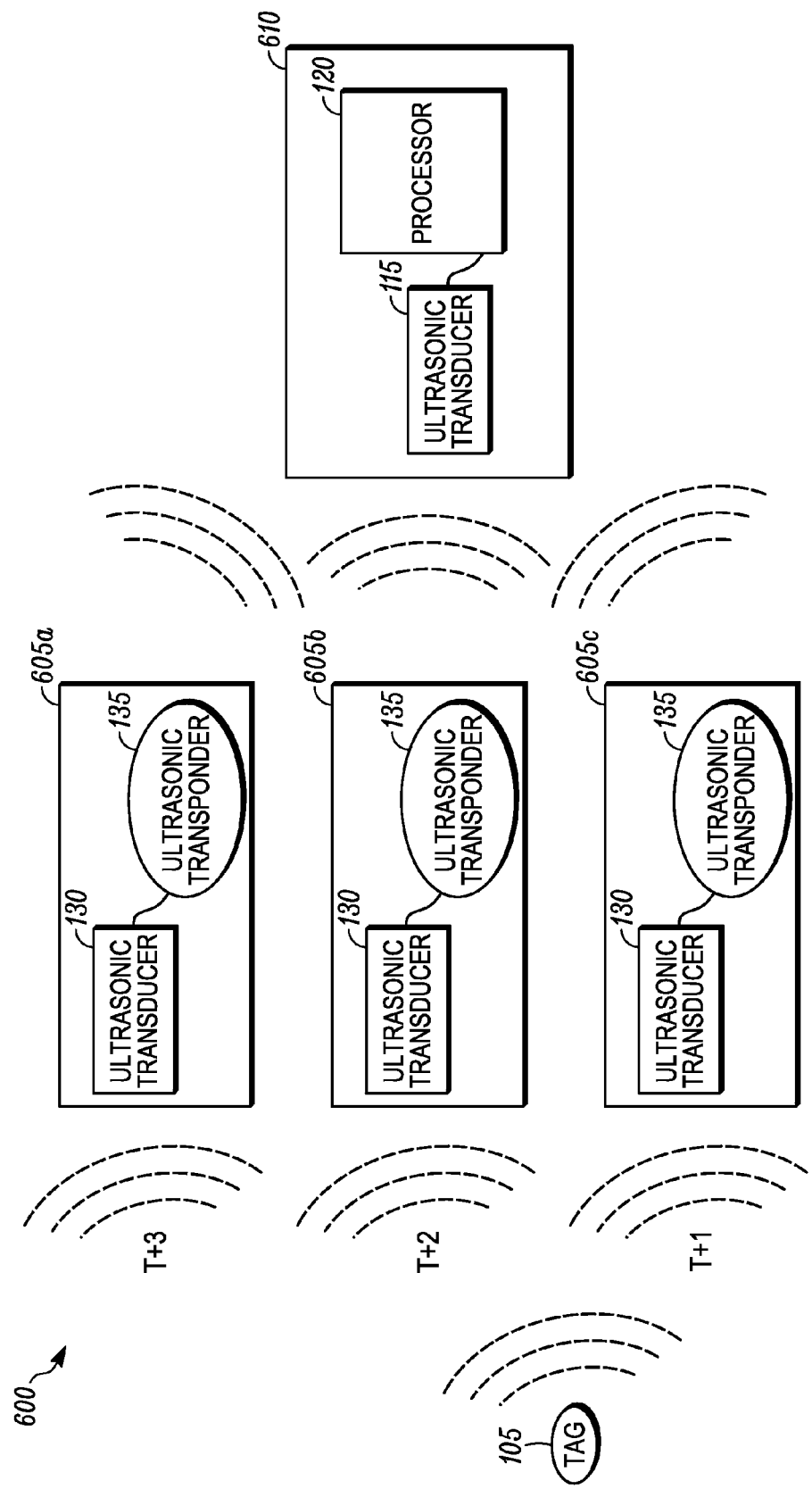
FIG. 6 is a block diagram of a system for estimating a location of an ultrasonic tag, in accordance with some embodiments.

FIG. 6 is a block diagram of a system 600 for estimating a location of an ultrasonic tag 105, according to one embodiment. The system 600 comprises an ultrasonic reader 610 and a plurality of ultrasonic repeaters 605a-605c.

The ultrasonic repeaters 605a-605c receive and rebroadcast ultrasonic data, as described earlier. The ultrasonic repeaters 605a-605c also, however, broadcast the time at which the original ultrasonic sound pressure wave was received.

After demodulation of the data, the ultrasonic repeaters 605a-605c each add information to the data relating to the reception time of the data. The data, including the added information, is then re-modulated and re-transmitted. According to certain embodiments, the information added to the data includes a time stamp, for example in a header or preamble of the data. The information can also include an identifier of the ultrasonic tag, a location of the ultrasonic tag, or any other suitable information. The received data can already include the header or preamble to which the information is added, or alternatively the header or preamble can be added to the data by the ultrasonic repeaters 605a-605c.

If the ultrasonic data is transmitted sequentially through a plurality of ultrasonic repeaters 605a-605c, multiple headers or preambles are advantageously added to the data cumulatively, enabling a determination of the path of the data from the ultrasonic tag 105 to the ultrasonic reader 610.

Upon reception of ultrasonic data from a plurality of ultrasonic repeaters 605a-605c, the ultrasonic reader 610 then performs an analysis to determine a location of the ultrasonic tag. According to one embodiment, the analysis includes determining a reception time of the data by a plurality of ultrasonic repeaters at different locations. Known triangulation methods are then used to determine a location, or an estimate of the location based upon the reception times.

Initially, the ultrasonic reader 610 can determine that the ultrasonic data corresponds to data from a single ultrasonic tag 105 at a single point of time. This can include a comparison of the locations of the ultrasonic repeaters 605a-605c, for example.

When the time-stamps for an individual ultrasonic tag 105 are received from more than one ultrasonic repeater 605a-605c that are within a small area, the ultrasonic receiver 610 can assume that the ultrasonic repeaters 605a-605c heard the same initial ultrasonic sound pressure wave at slightly different times. This information can then be used to estimate the location of the ultrasonic tag 105 relative to the ultrasonic repeaters 605a-605c that heard it. The same technique could be used to establish the location of the ultrasonic repeaters 605a-605c themselves. Angular data from the ultrasonic repeaters 605a-605c could be used in a similar way or simply to enhance the time-stamp based location estimate.

Ultrasonic sound pressure waves travel more than eight hundred thousand times slower than radio waves. This offers a noticeable advantage over radio waves when establishing the position of a tag, as the difference in arrival times of the ultrasonic sound pressure wave is exaggerated.

Figure 7:
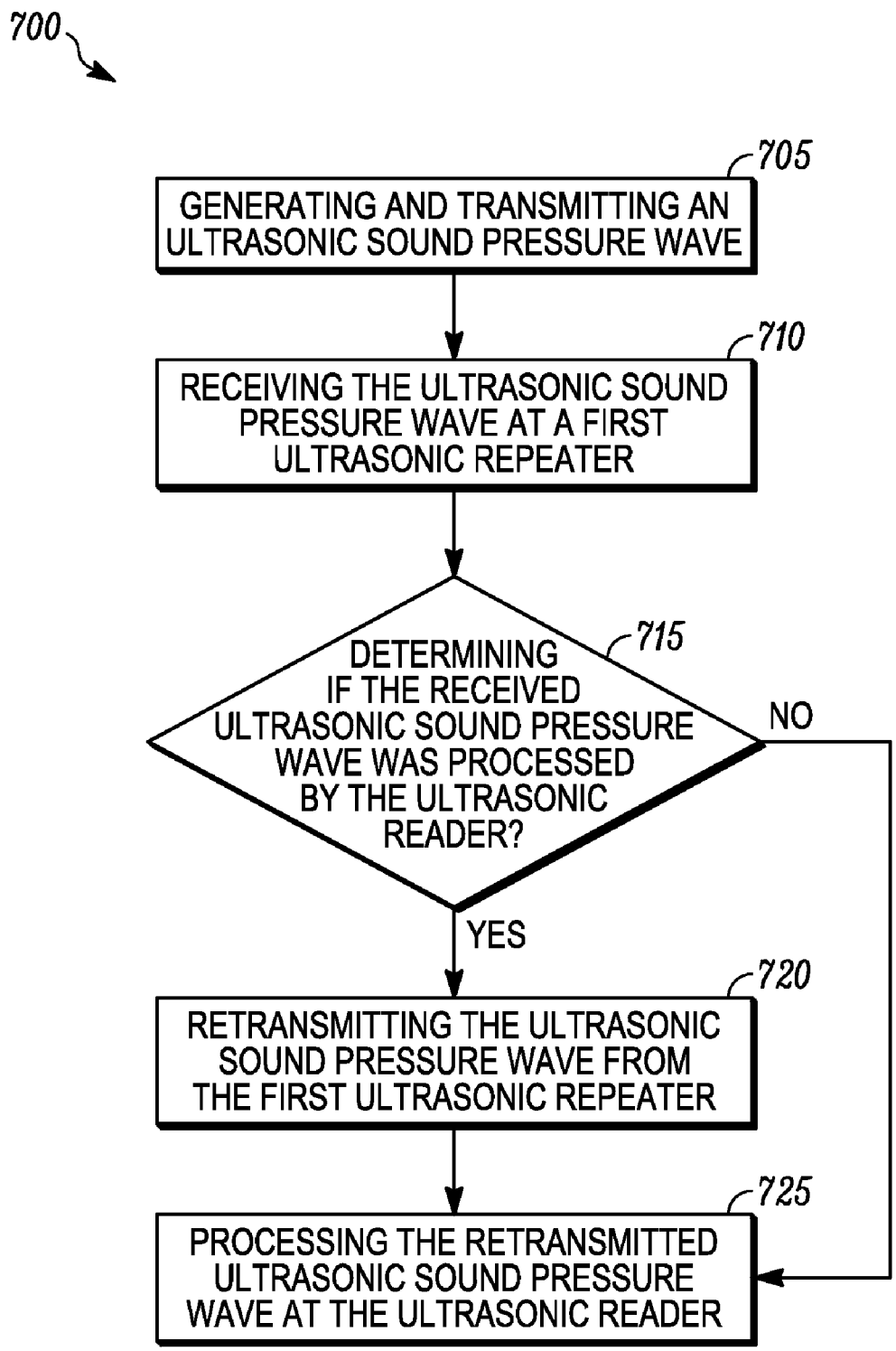
FIG. 7 is a diagram illustrating a method of transmitting data from an ultrasonic tag to an ultrasonic reader, in accordance with some embodiments.

FIG. 7 is a diagram illustrating a method 700 of transmitting data from an ultrasonic tag to an ultrasonic reader, according to one embodiment.

In 705, an ultrasonic sound pressure wave is generating and transmitted by the ultrasonic tag.

In 710, the ultrasonic sound pressure wave is received at a first ultrasonic repeater.

In 715, it is determined if the received ultrasonic sound pressure wave was received and/or processed by the ultrasonic reader.

If yes, in 720, a copy of the ultrasonic sound pressure wave is retransmitted from the first ultrasonic repeater. If no, 720 is not performed.

In 725, the retransmitted ultrasonic sound pressure wave is processed at the ultrasonic reader.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of transmitting data from an ultrasonic tag to an ultrasonic reader comprising:
   generating and transmitting an ultrasonic sound pressure wave;
   receiving the ultrasonic sound pressure wave at a first ultrasonic repeater;
   determining, by the first ultrasonic repeater, that the received ultrasonic sound pressure wave was not processed at the ultrasonic reader;
   retransmitting, by the first ultrasonic repeater, a copy of the ultrasonic sound pressure wave from the first ultrasonic repeater; and
   processing the retransmitted ultrasonic sound pressure wave at the ultrasonic reader.

2. The method of claim 1, wherein determining that the received ultrasonic sound pressure wave was not processed at the ultrasonic reader comprises determining that a sound pressure level of the received ultrasonic sound pressure wave is below a predetermined threshold.

3. The method according to claim 1, wherein generating and transmitting an ultrasonic sound pressure wave is performed at the ultrasonic tag or at another ultrasonic repeater.

4. The method of claim 1, wherein determining that the received ultrasonic sound pressure wave was not processed at the ultrasonic reader comprises determining that a second ultrasonic repeater did not receive the ultrasonic sound pressure wave.

5. The method of claim 4, wherein determining that the second ultrasonic repeater did not receive the ultrasonic sound pressure wave comprises determining that a broadcast from the second ultrasonic repeater was not received within a predetermined time limit.

6. The method of claim 1, further comprising:
   receiving the ultrasonic sound pressure wave at a second ultrasonic repeater; and
   estimating the location of the ultrasonic tag using the times at which the ultrasonic sound pressure wave was received by each of the first ultrasonic repeater and the second ultrasonic repeater;
   wherein each repeater broadcasts the time at which the ultrasonic sound pressure wave was received by the repeater.

7. The method of claim 6, wherein estimating the location of the ultrasonic tag further comprises using location or angular data of the first and second ultrasonic repeaters.

8. The method of claim 5 wherein the broadcast is received using one of sonic, ultrasonic, wired electrical, optical, radio frequency, or radio frequency backscatter signaling.

9. A system for transmitting ultrasonic data comprising:
   an ultrasonic tag, for generating and transmitting an ultrasonic sound pressure wave;
   an ultrasonic repeater comprising:
      an ultrasonic receiver, for receiving the ultrasonic sound pressure wave;
      a processor, coupled to the ultrasonic receiver;
      a memory coupled to the processor, the memory including program code when executed by the processor for determining that the received ultrasonic sound pressure wave was not processed at the ultrasonic reader; and
      an ultrasonic transmitter, coupled to the processor, for retransmitting the ultrasonic sound pressure wave from the ultrasonic repeater; and
   an ultrasonic reader comprising:
      an ultrasonic receiver, for receiving a retransmitted ultrasonic sound pressure wave.

10. The system according to claim 9, wherein the ultrasonic tag is a component of another ultrasonic repeater.

11. The system of claim 9, wherein memory further includes program code for determining a sound pressure level of the received ultrasonic sound pressure wave, and wherein determining that the received ultrasonic sound pressure wave was not processed at the ultrasonic reader comprises determining that the sound pressure level is below a predetermined threshold.

12. The system of claim 9, wherein memory further includes program code for determining if a second ultrasonic received the ultrasonic sound pressure wave, and wherein determining that the received ultrasonic sound pressure wave was not processed at the ultrasonic reader comprises determining that the second ultrasonic repeater did not receive the ultrasonic sound pressure wave.

13. The system of claim 9, wherein the program code for determining that the second ultrasonic repeater did not receive the ultrasonic sound pressure wave comprises program code for determining that a broadcast from the second ultrasonic repeater was not received within a predetermined time limit.

14. The system of claim 9, further comprising a second ultrasonic repeater comprising:
   an ultrasonic receiver, for receiving the ultrasonic sound pressure wave;
   a processor, coupled to the ultrasonic receiver;
   a memory coupled to the processor;
   an ultrasonic transmitter coupled to the processor; wherein:
   each repeater of the first ultrasonic repeater and the second ultrasonic repeater includes program code for determining a time at which the ultrasonic sound pressure wave was received, and broadcasting the time at which the ultrasonic sound pressure wave was received; and
   wherein the ultrasonic reader further comprises a processor coupled to the ultrasonic receiver and a memory coupled to the processor, the memory including program code when executed by the processor for estimating the location of the ultrasonic tag using the times at which the ultrasonic sound pressure wave was received by each repeater.

15. The system of claim 14, wherein the program code for estimating the location of the ultrasonic tag comprises using location or angular data of the repeaters.

16. The system of claim 13, wherein the ultrasonic repeaters broadcast comprises one of sonic, ultrasonic, wired electrical, optical, radio frequency, or radio frequency backscatter signaling.

* * * * *